F. W. STEWART.
GLASS BLOWING MACHINE.
APPLICATION FILED OCT. 27, 1915.
1,294,319.
Patented Feb. 11, 1919.
2 SHEETS—SHEET 1.
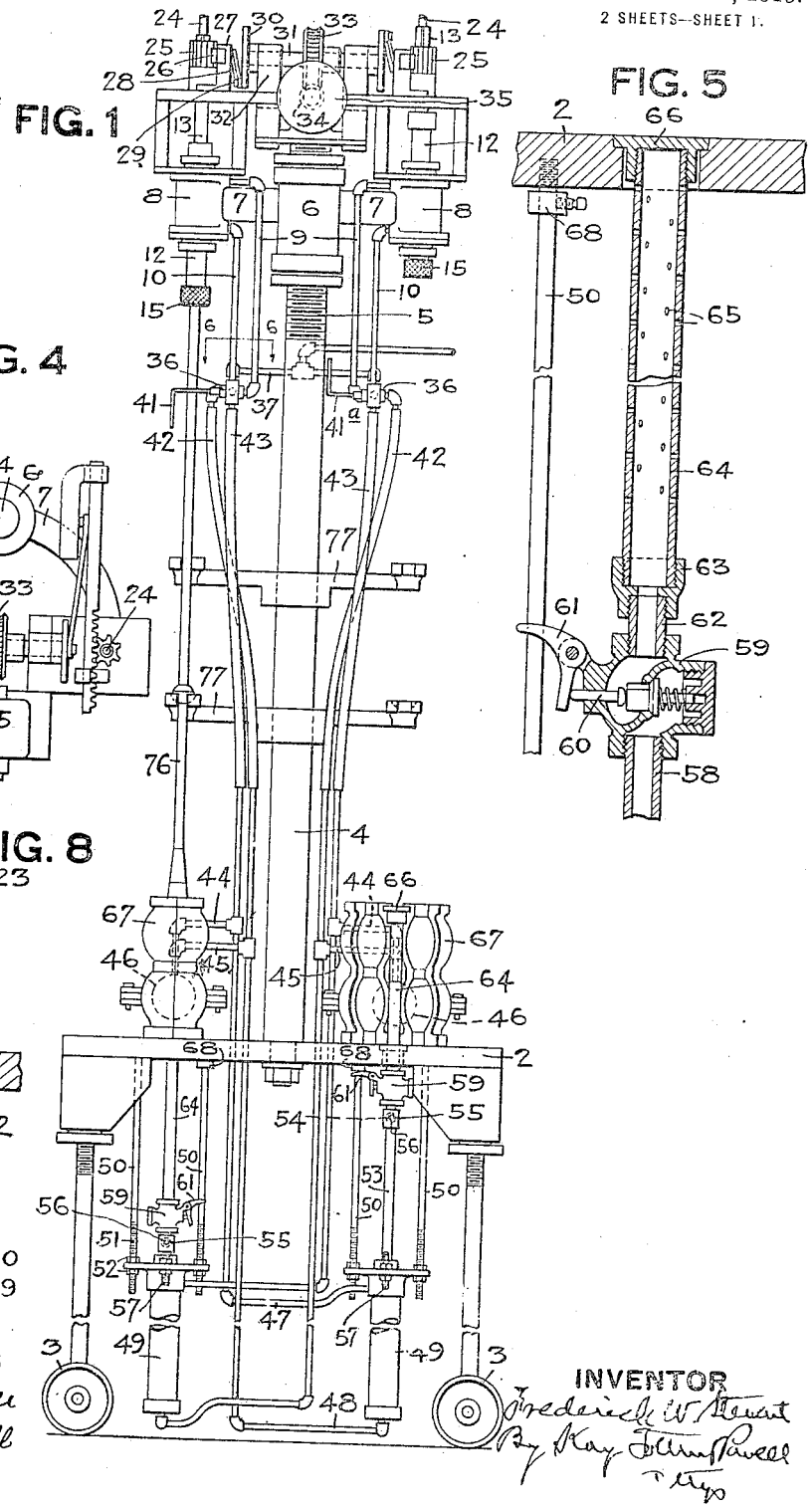

F. W. STEWART.
GLASS BLOWING MACHINE.
APPLICATION FILED OCT. 27, 1915.
1,294,319.
Patented Feb. 11, 1919.
2 SHEETS—SHEET 2.
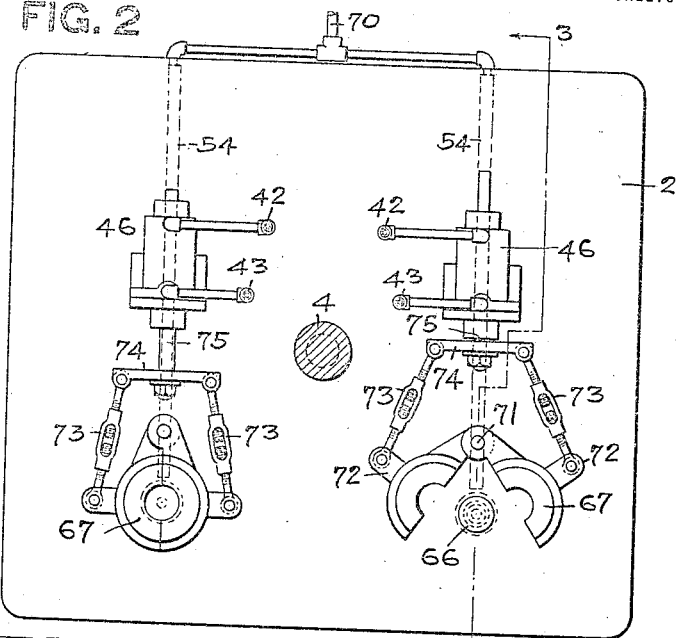
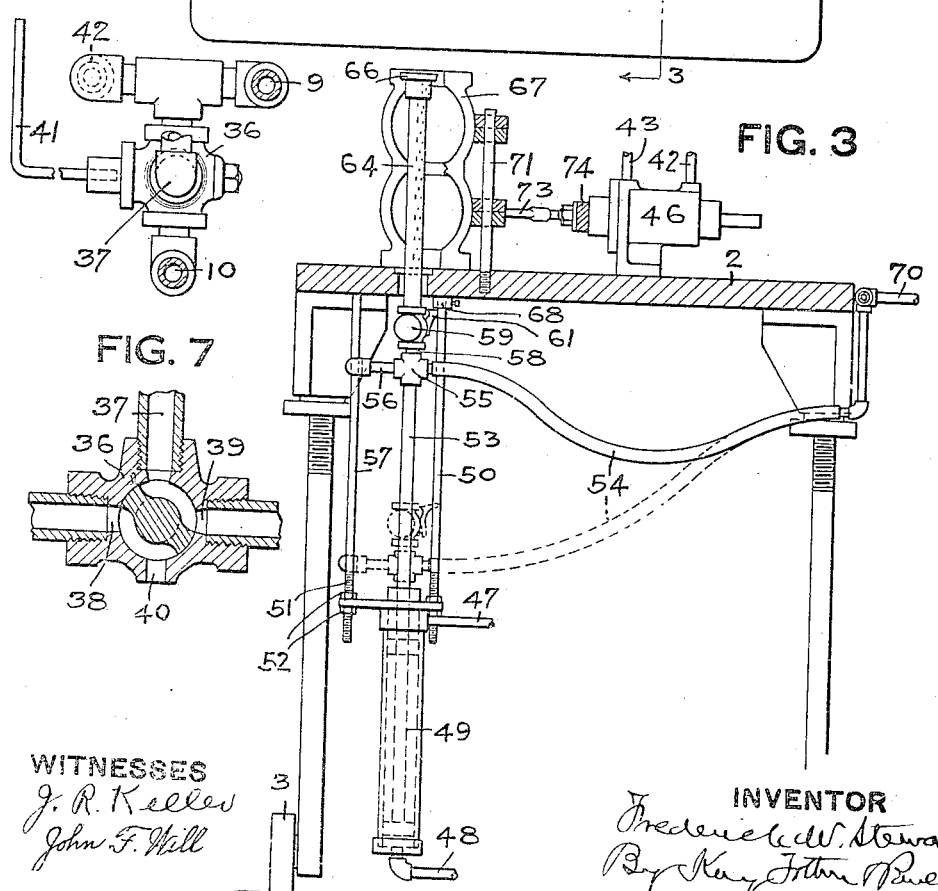
WITNESSES
J. R. Keller
John F. Will
INVENTOR
Frederick W. Stewart
By Kay Totten Buell
attys

UNITED STATES PATENT OFFICE.

FREDERICK W. STEWART, OF BEAVER, PENNSYLVANIA.

GLASS-BLOWING MACHINE.

1,294,319.

Specification of Letters Patent.   Patented Feb. 11, 1919.

Application filed October 27, 1915.   Serial No. 58,218.

*To all whom it may concern:*

Be it known that I, FREDERICK W. STEWART, a citizen of the United States, and resident of Beaver, in the county of Beaver and State of Pennsylvania, have invented a new and useful Improvement in Glass-Blowing Machines; and I do hereby declare the following to be a full, clear, and exact description thereof.

My invention relates to a glass blowing machine, and more especially to the blowing of paste-mold ware, where the blow-pipe is supported in proper position with reference to the blow-mold and oscillated during the blowing operation, so as to prevent formation of a fin upon the article being blown. In this class of machine it was necessary to cool the mold by dipping into a body of water or spraying the same, and it is to this feature of cooling the mold that my invention relates in one particular.

In the accompanying drawings, Figure 1 is a front elevation of my improved machine; Fig. 2 is a plan view of the mold supporting table with the molds mounted thereon; Fig. 3 is a section on the line 3—3 Fig. 2; Fig. 4 is a plan view of the mechanism for oscillating the blow-pipe; Fig. 5 is an enlarged vertical section of the spraying device; Fig. 6 is a plan view of the valve and the air-pipe connections therefrom; Fig. 7 is a sectional view of the valve; and Fig. 8 is a vertical section of the blow-pipe connection and the method of supplying air thereto.

Referring to the drawings, 2 designates a suitable table or support which may be mounted on the wheels 3 for convenience in transferring the device from one point in the factory to another.

Stepped in the table 2 is the pillar or column 4 which is threaded as at 5 at its upper end and engaging said threaded portion is the sleeve 6 which has the arms 7 projecting therefrom.

These arms 7 carry the cylinders 8 with which the pipes 9 and 10 communicate at the upper and lower ends thereof, respectively.

Within the cylinder 8 is the piston 11 into which is screwed the sleeve 12. In the bore of the sleeve 12 is the rotary air-pipe 13. Screwed to the lower end of the air-pipe 13 is the coupler 15 and in said coupler is the chuck 16 resting on the shoulder 17 in said coupler. The chuck 16 has the polygonal opening 18 to receive the correspondingly shaped upper end of the blow-pipe, so that the blow-pipe, when inserted therein, will have the same rotary motion imparted to it. The pin 19 in the chuck 16 engages a vertical groove 20 in the inner wall of the coupler 15 which permits the slight vertical movement of the chuck 16 in said coupler, and at the same time causes said chuck to rotate with the coupler.

In the upper end of the air-pipe 13 is the swivel-member 21 having the groove 22 engaged by the set screw 23 in the air-pipe 13. The air supply pipe 24 is connected up to the swivel-member 21, and by this construction the pipe 24 and swivel-member remain stationary while the air-pipe rotates around said swivel-member.

Mounted on the air-pipe 13 is the toothed pinion 25 with which the rack-bar 26 engages. The rack-bar 26 moves in guides 27 and the pitman 28 is connected with said rack-bar and to the wrist-pin 29 on the eccentric 30 mounted on the shaft 31. This shaft 31 is mounted in suitable bearings 32 carried by the column 4. A worm-wheel 33 on the shaft 31 is engaged by the worm 34 of the motor 35.

The pipes 9 and 10 are connected up to the triple-valve 36. This triple-valve has the inlet-port 37, which is adapted to communicate with the ports 38 and 39 according to the position of the valve. The valve is provided with the exhaust-vent 40. A handle 41 is provided for operating the valve.

The pipes 42 and 43 are connected to the ports 38 and 39, respectively, and pipes 9 and 10 communicate, respectively, with the ports 38 and 39.

The pipes 42, 43 extend downwardly and communicate with the pipes 44 and 45, respectively, leading to the opposite ends of the mold-operating cylinder 46. Said pipes 42 and 43 still extend farther downwardly and communicate with the pipes 47 and 48 respectively, leading to the upper and lower ends of the spray-operating cylinders 49. These cylinders 49 are supported below the table 2 by the bars 50, which are threaded as at 51 and by adjusting the nuts 52, the cylinders may be raised and lowered according to the height to which the spray-pipe is to be elevated, as hereinafter set forth.

The piston-rod 53 has the connection 55 carried thereby and connected to said connection is the flexible pipe 54. Projecting from one side of the joint 55 is the projection 56, which engages the guide-rod 57 extending down from the table 2.

Through the connection 55 the flexible pipe 54 communicates with the nipple 58 screwed into said connection 55. A valve 59 is connected to said nipple, as indicated in Fig. 5, said valve being of ordinary construction with the stem 60 projecting out therefrom and engaging the trigger 61.

A nipple 62 is connected with the valve 59, and a collar 63 connects said nipple with the spray-pipe 64 provided with the perforations 65. A cap 66 is connected with the upper end of the spray-pipe 64, said cap, when the spray-pipe is lowered acting to form the bottom of the blow-mold 67.

A collar 68 on the rod 50 extending downwardly from the table 3 is in the path of the trigger 61, and when said trigger engages said collar, the valve is opened and the water admitted to the pipe for spraying the mold.

A flexible pipe 54 is connected up with a suitable supply-pipe 70.

The mold illustrated is an ordinary two-part paste-mold adapted for blowing shades or globes, and is a double mold, in that two articles are blown at one time. The mold-sections are hinged on the vertical pin 71 and the lugs 72 on the mold-sections are connected up by the turn-buckles 73 with the yoke 74, connected to the piston-rod 75 of the cylinder 46. By the employment of the turn-buckles 73 the mold-halves may be quickly and easily adjusted so as to center the mold properly with reference to the blow-pipe, and by the use of same the tedious and slow method of adjusting the mold-sections heretofore employed is avoided.

When my improved machine is in operation, the glass is gathered on the blow-pipe 76 and the blow-pipe is inserted in the support 77, whereupon the operator moves the handle 41, which through the connections described admits air into the upper end of the cylinder 8, thereby lowering the coupler 15 onto the blow-pipe, so that the chuck 16 will engage the upper end of said pipe. At the same time, the air is also delivered by the pipe 43 to the cylinder 46, to close the mold-halves around the lower end of the blow-pipe, and furthermore by the same operation the air is delivered by the pipe 42 to the lower end of the cylinder 49 of the opposite open mold, which acts to raise the spray-pipe within said mold to spray the same, all as clearly indicated in Fig. 1.

Just as soon as the halves of the blow-mold have been closed around the lower end of the blow-pipe, the article is blown by air supplied by the pipe 24. At the same time that the blowing operation is taking place, the motor 35 acts through the connections described to reciprocate the rack-bars 26, whereby an oscillatory movement is imparted to the coupler 15, and consequently to the blow-pipe 76. When the blowing operation is finished, the operator throws back the handle 41, operated as above, and moves the other handle 41ª. This operation acts to raise the coupler 15 which has been previously lowered and opens the corresponding blow-mold, and at the same time lowers the spray-pipe. The operation of the handle 41ª lowers its corresponding coupler 15 into position over the end of the blow-pipe, which in the meantime has been inserted in the support 77, and its corresponding blow-mold is closed, while at the same time the spray-pipe is raised into the other blow-mold, which in the meantime has been opened as described. In this manner, the molds are operated alternately, one being sprayed while the other is closed for the blowing operation.

In case it is desired to stop the rotation of the blow-pipe, as for instance where the glass in the mold is not expanding properly and is twisting around in the mold, it is only necessary to move the handle 41 into position to withdraw the coupler 15, whereupon the rotation of the blow-pipe ceases at once. If the blow-pipe is allowed to continue with the glass twisting around in the mold great damage is done to the paste-lining of the mold. The blowing operation can be interrupted at any stage of the blowing operation and the coupler withdrawn.

By projecting the spray-pipe up within the open mold all parts of the mold are reached by the spray, and when said spray-pipe is lowered the cap at the upper end thereof forms the bottom of the blow-mold.

The machine is very simple and requires no skill for its operation, the only movement required on the part of the operator being the operating of the handles of the valves, as all the other operations follow automatically.

What I claim is:

1. In glass blowing apparatus, the combination of a suitable support, a blow-mold, an operating cylinder for opening and closing same, a blow-pipe support, a vertically movable blow-pipe connection, a cylinder for operating same, a vertically movable spray-pipe, a cylinder for operating same, fluid supply connections leading to the opposite ends of said cylinders, and a valve controlling the said connections, whereby in the operation of said valve the operation of said blow-pipe connection, the mold and the spray-pipe takes place simultaneously.

2. In glass-blowing apparatus, the combination of a suitable support, a pair of blow-molds mounted on said support, operating cylinders for opening and closing same, vertically movable spray-pipes, cylinders for operating same, and means operated simultaneously with the operation of the opening and closing of one blow-mold for raising and lowering the spray-pipe in the other blow-mold.

3. In glass-blowing apparatus, the combination of a suitable support, a partible blow-mold carried thereby, a vertically movable spray-pipe, means for raising and lowering said spray-pipe, and the upper end of said spray-pipe when lowered forming the bottom of said mold.

4. In glass-blowing apparatus, the combination of a suitable support, a partible blow-mold carried thereby, a vertically movable spray-pipe, and a cap at the upper end of said spray-pipe, means for raising and lowering said spray-pipe, said cap forming the bottom of said blow-mold when lowered.

5. In glass-blowing apparatus, the combination of a suitable support, a partible blow-mold carried thereby, a vertically movable spray-pipe, means for raising and lowering said spray-pipe, a flexible supply-pipe leading to said spray-pipe, a valve between said spray-pipe and said supply-pipe, and means for automatically operating said valve.

In testimony whereof, I, the said FREDERICK W. STEWART, have hereunto set my hand.

FREDERICK W. STEWART.

Witnesses:
ROBT. D. TOTTEN,
JOHN F. WILL.